United States Patent
Hong

(10) Patent No.: US 8,228,459 B2
(45) Date of Patent: Jul. 24, 2012

(54) BACKLIGHT UNIT AND LIQUID CRYSTAL DISPLAY DEVICE HAVING THE SAME

(75) Inventor: Bongtaek Hong, Cheongju-si (KR)

(73) Assignee: LG Electronics Inc., Seoul (KR)

( * ) Notice: Subject to any disclaimer, the term of this patent is extended or adjusted under 35 U.S.C. 154(b) by 337 days.

(21) Appl. No.: 12/599,119

(22) PCT Filed: Dec. 27, 2007

(86) PCT No.: PCT/KR2007/006876
§ 371 (c)(1),
(2), (4) Date: Nov. 6, 2009

(87) PCT Pub. No.: WO2008/150057
PCT Pub. Date: Dec. 11, 2008

(65) Prior Publication Data
US 2010/0220256 A1    Sep. 2, 2010

(30) Foreign Application Priority Data
Jun. 4, 2007  (KR) .................. 10-2007-0054545

(51) Int. Cl.
 G02F 1/1333  (2006.01)
 F21V 7/04    (2006.01)
(52) U.S. Cl. ............ 349/58; 349/56; 349/61; 362/608; 362/97.1
(58) Field of Classification Search .......... 349/56, 349/61, 62, 65, 57, 58, 59, 60, 64, 112; 362/97.1, 362/97.2, 97.3, 97.4, 608
See application file for complete search history.

(56) References Cited

U.S. PATENT DOCUMENTS

| | | | |
|---|---|---|---|
| 6,241,358 B1 | 6/2001 | Higuchi et al. | |
| 6,469,755 B1 | 10/2002 | Adachi et al. | |
| 7,581,845 B2 * | 9/2009 | Lee | 362/97.2 |
| 2002/0021563 A1 | 2/2002 | Ohsumi | |
| 2002/0197051 A1 | 12/2002 | Tamura et al. | |
| 2003/0137821 A1 | 7/2003 | Gotoh et al. | |
| 2003/0179566 A1 | 9/2003 | Ito | |
| 2003/0179580 A1 | 9/2003 | Ito et al. | |
| 2006/0044779 A1 * | 3/2006 | Lee | 362/29 |
| 2006/0061705 A1 | 3/2006 | Onishi | |
| 2006/0103774 A1 * | 5/2006 | Han et al. | 349/58 |
| 2006/0291065 A1 * | 12/2006 | Hasei et al. | 359/619 |
| 2010/0220256 A1 * | 9/2010 | Hong | 349/58 |

(Continued)

FOREIGN PATENT DOCUMENTS

JP    7-333442    12/1995

(Continued)

OTHER PUBLICATIONS

Taiwanese Office Action dated Nov. 23, 2011 issued in Application No. 97102283 (with English translation).

(Continued)

*Primary Examiner* — Brian Healy
(74) *Attorney, Agent, or Firm* — KED & Associates LLP

(57) ABSTRACT

A backlight unit and liquid crystal display device comprising the backlight unit is disclosed. A backlight unit comprises a light source, an optical sheet where light from the light source is incident, a frame surrounding an edge portion of the optical sheet; and at least one sheet holder disposed at a bottom part of the frame facing the optical sheet.

20 Claims, 7 Drawing Sheets

U.S. PATENT DOCUMENTS

2010/0283937 A1* 11/2010 Takeba ............................ 349/61
2010/0290211 A1* 11/2010 Takeba ......................... 362/97.1

FOREIGN PATENT DOCUMENTS

| JP | 2004-38108 | 2/2004 |
| JP | 2006-024429 | 1/2006 |
| JP | 2006-278251 | 10/2006 |
| JP | 2007-123086 | 5/2007 |
| KR | 1998-064332 | 11/1998 |
| KR | 10-2004-00376 06 | 5/2004 |
| KR | 2005-0030397 | 3/2005 |
| KR | 10-2005-0065116 | 6/2005 |
| TW | 200408882 A | 6/2004 |
| TW | I230238 B | 4/2005 |

OTHER PUBLICATIONS

International Search Report dated Mar. 24, 2008.
Korean Office Action dated Feb. 29, 2008.
Korean Notice of Allowance dated Nov. 26, 2008.

* cited by examiner

[FIG. 1]
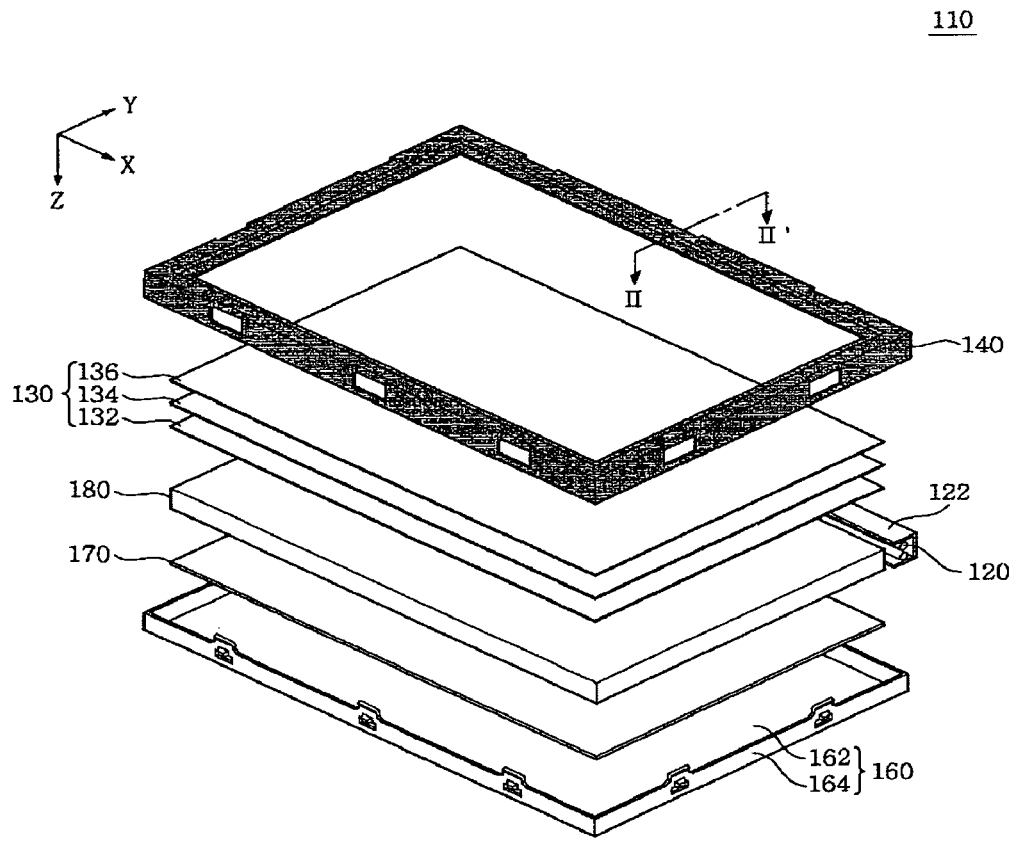
[FIG. 2]
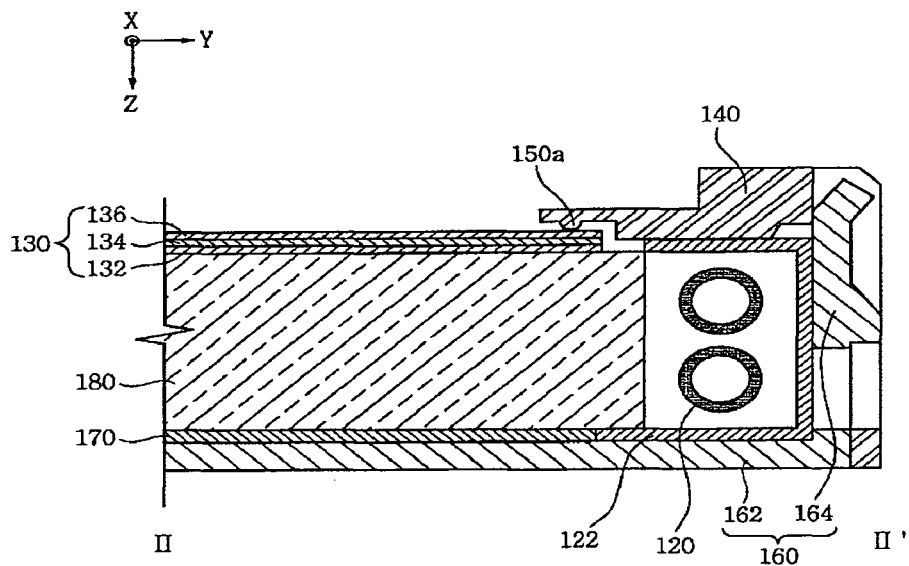

[FIG. 3]
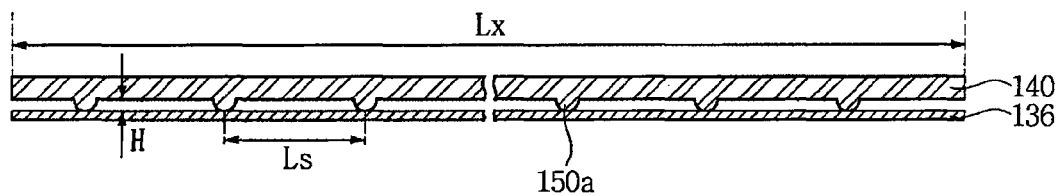
[FIG. 4]
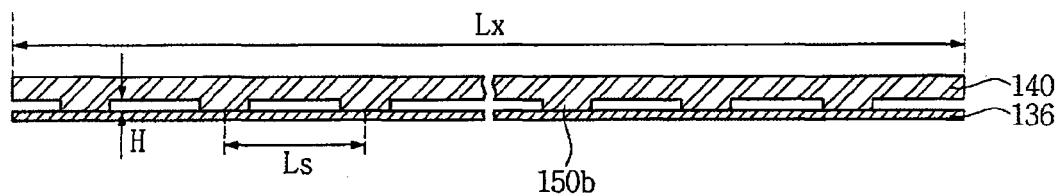
[FIG. 5]
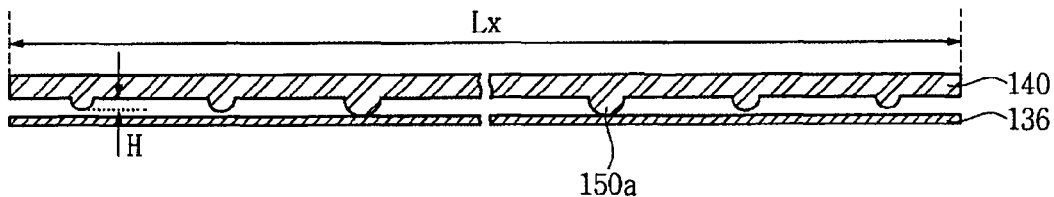

[FIG. 6]
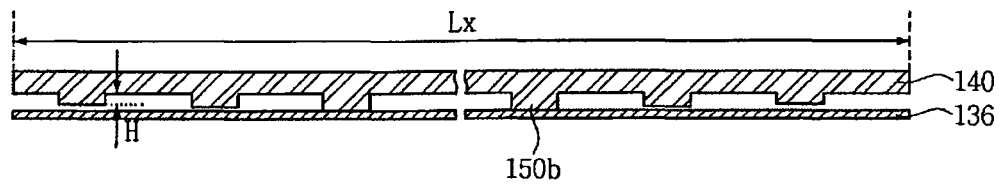
[FIG. 7]
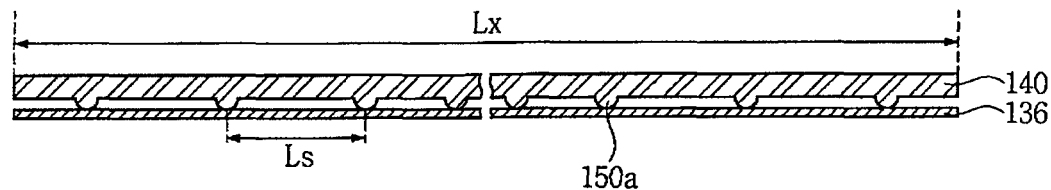
[FIG. 8]
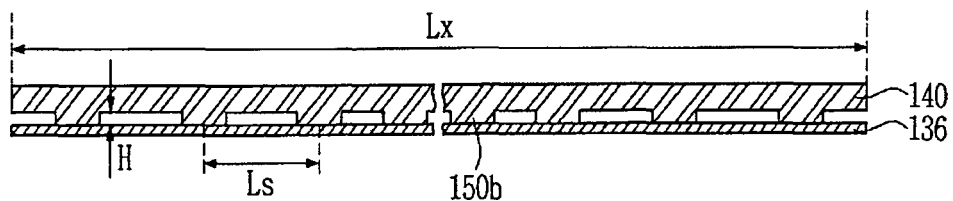

[FIG. 9]
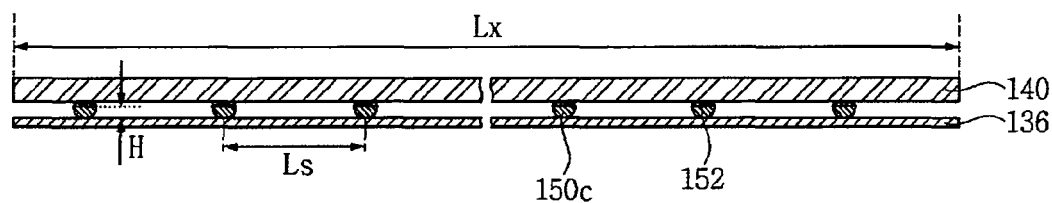
[FIG. 10]
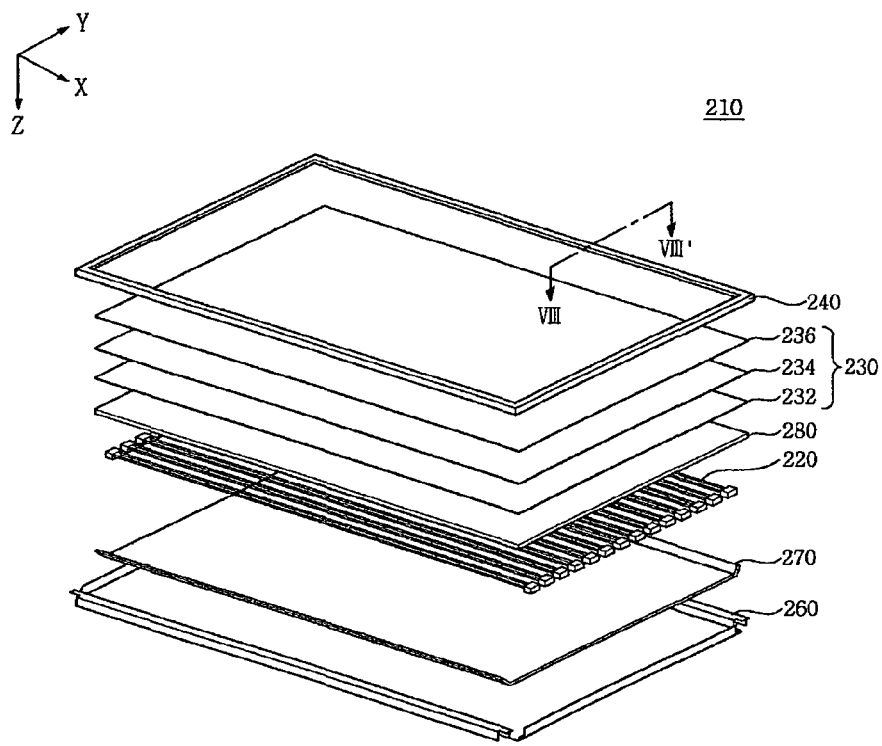

[FIG. 11]
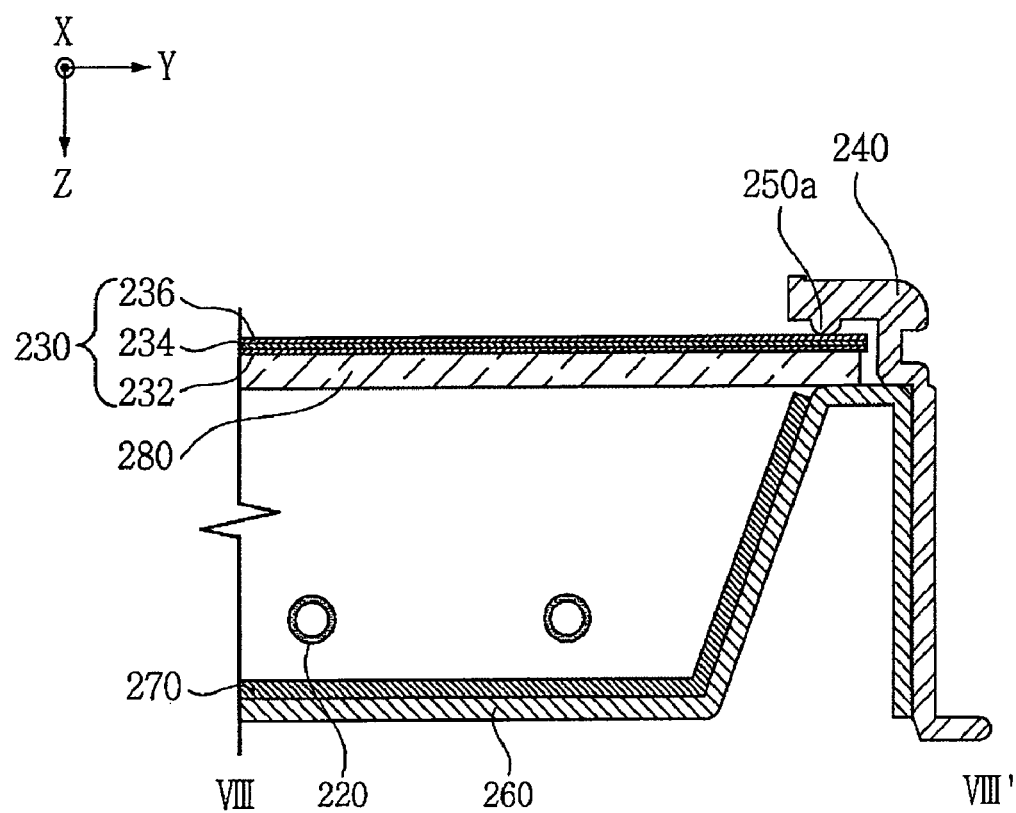

[FIG. 12]
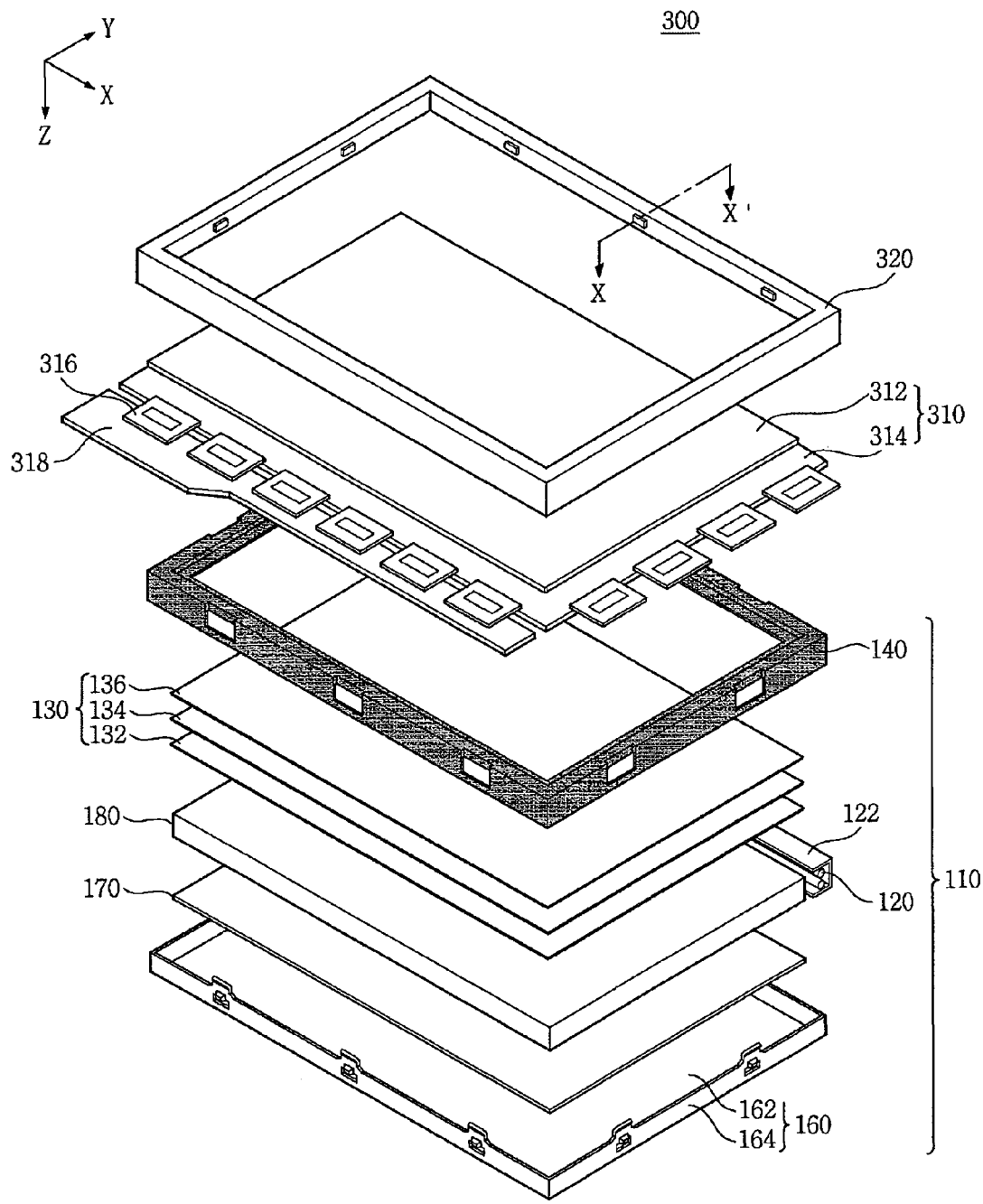

[FIG. 13]
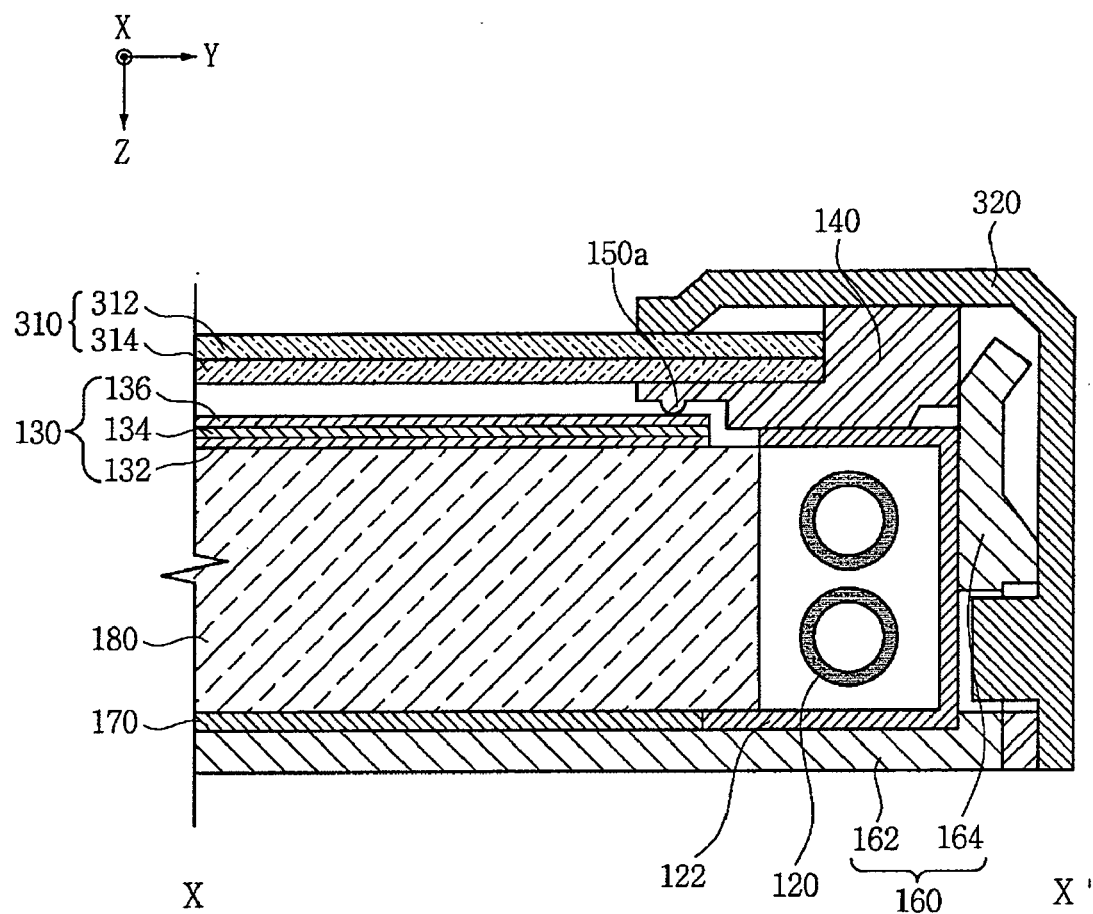

BACKLIGHT UNIT AND LIQUID CRYSTAL DISPLAY DEVICE HAVING THE SAME

TECHNICAL FIELD

This document relates to a backlight unit and a liquid crystal display device having the same.

BACKGROUND ART

Liquid crystal display device, which is a passive display device, comprises a backlight unit installed under a liquid crystal panel.

Backlight unit comprises a light source, an optical sheet, a frame, a bottom cover, etc. in a single module form and can provide light to a liquid crystal panel.

In the backlight unit, the light source receives a voltage from an external driving power source and emits light, however, can emit a heat incidentally. The heat emitted from the light source causes a thermal expansion of the optical sheet adjacent to the light source.

In consideration of the thermal expansion of the optical sheet, a frame surrounding an edge portion of the optical sheet can be spaced a predetermined distance apart from the optical sheet.

DISCLOSURE OF INVENTION

Technical Problem

The optical sheet may be partially subjected to non-uniform thermal expansion because a heat emitted from the light source may be non-uniform at each part of the optical sheet.

This leads to occurrence of a deformation of the optical sheet caused by a heat emitted from the light source. For example, wrinkles may occur.

Technical Solution

An aspect of this document is to provide a backlight unit and liquid crystal display device comprising the backlight unit capable of preventing a deformation of optical sheet and capable of improving the quality In an aspect, a backlight unit comprises a light source, an optical sheet where light from the light source is incident, a frame surrounding an edge portion of the optical sheet, and at least one sheet holder disposed at a bottom part of the frame facing the optical sheet.

In another aspect, a liquid crystal display device, comprises a light source, an optical sheet where light emitted from the light source is incident, a frame surrounding an edge portion of the optical sheet, at least one sheet holder disposed at a bottom part of the frame facing the optical sheet and a liquid crystal display panel disposed on the frame.

Advantageous Effects

This document is to provide a backlight unit and liquid crystal display device comprising the backlight unit capable of preventing a deformation of optical sheet and capable of improving the quality

BRIEF DESCRIPTION OF THE DRAWINGS

FIG. 1 is an exploded perspective view illustrating a construction of a backlight unit in accordance with an exemplary embodiment of the present invention.

FIG. 2 is a cross section taken along line II-II' of FIG. 1;

FIGS. 3 to 9 are views illustrating a sheet holder in detail in accordance with an exemplary embodiment of the present invention;

FIG. 10 is an exploded perspective view illustrating a construction of a backlight unit in accordance with an exemplary embodiment of the present invention;

FIG. 11 is a cross section taken along line VIII-VIII' of FIG. 10;

FIG. 12 is an exploded perspective view illustrating a construction of a liquid crystal display device in accordance with an exemplary embodiment of the present invention; and FIG. 13 is a cross section taken along line X-X' of FIG. 12.

BEST MODE FOR CARRYING OUT THE INVENTION

FIG. 1 is an exploded perspective view illustrating a construction of a backlight unit in accordance with an exemplary embodiment of the present invention. FIG. 2 is a cross section taken along line II-II' of FIG. 1.

FIGS. 1 and 2 show an edge type backlight unit. However, this is to describe a backlight unit according to an exemplary embodiment of the present invention and hence, is not intended to limit the scope of the present invention.

Referring to FIGS. 1 and 2, the backlight unit 110 can be comprised in a liquid crystal display device. The backlight unit 110 can provide light to a liquid crystal panel comprised in the liquid crystal display device.

The backlight unit 110 can comprise a light source 120, an optical sheet 130, a frame 140, and a sheet holder 150a. The backlight unit 110 can further comprise a bottom cover 160, a reflector plate 170, and a light guide plate 180.

The light source 120 can receive a voltage applied from an external driving power source, generating and emitting light.

The light source 120 can be formed one or more at one side of the light guide plate 180 along an X-axis direction that is a long-axis direction of the light guide plate 180, or can be formed one or more at each of both sides of the light guide plate 180 along the X-axis direction. Light emitted from the light source 120 can be directly incident inside the light guide plate 180, or can be incident inside the light guide plate 180 after being reflected from a light source housing 122.

The light source 120 can be at least one of, but not limited to, Cold Cathode Fluorescent Lamp (CCFL), Hot Cathode Fluorescent Lamp (HCFL), External Electrode Fluorescent Lamp (EEFL), and Light Emitting Diode (LED)

The optical sheet 130 is disposed over the light guide plate 180, and can improve optical characteristics of the light, for example, a luminance and a viewing angle, by diffusing and concentrating light emitted from the light source 120.

For example, the optical sheet 130 can be configured to have a structure where a diffuser sheet 132, a first prism sheet 134, and a second prism sheet 136 are laminated in regular sequence. However, this is not intended to limit the scope of the present invention since the number of the optical sheet 130 can be different depending on a specification of the backlight unit 110. For example, a protector sheet or a reflective polarization film can be additionally disposed over the second prism sheet 136. The optical sheet 130 can be configured with one or more sheets. A laminated sequence of the optical sheet 130 is not also limited to the above.

The frame 140 is formed in an approximately square shape, and can be disposed in the outermost of constituent elements of the backlight unit 110 to surround an edge portion of the optical sheet 130. The frame 140 can be combined with the bottom cover 160 in a top down manner.

The frame 140 can be formed of, for example, polycarbonate through injection molding, but this is not intended to limit the scope of the present invention. For example, the frame 140 can be at least one of epoxy, polyurethane, and polyacrylate.

The sheet holder 150a can be disposed at a bottom part of the frame 140 facing the optical sheet 130. The sheet holder 150a is formed along a long-axis or short-axis edge portion of the frame 140, and can be formed one or more. The sheet holder 150a can hold the optical sheet 130 by pressing the optical sheet 130 in Z-axis direction. Specifically, the sheet holder 150a can hold the second prism sheet 136 disposed in the uppermost of the optical sheet 130. Of the optical sheet 130, the diffuser sheet 132 and the first prism sheet 134 disposed under the second prism sheet 136 are not in direct contact with the sheet holder 150a, but can be held as the sheet holder 150a presses the second prism sheet 136.

The sheet holder 150a can hold the optical sheet 130, preventing a deformation of the optical sheet 130 caused by a heat radiated from the light source 120. For example, wrinkles, etc. can be prevented.

The sheet holder 150a will be described in more detail with reference to FIGS. 3 and 9.

FIG. 3 is a view illustrating a sheet holder in detail in accordance with an exemplary embodiment of the present invention. FIG. 3 shows an example in which the sheet holder is formed along a long-axis edge portion of the optical sheet. The sheet holder can be formed along a long-axis or short-axis edge portion of the optical sheet. A case where the sheet holder is formed along the short-axis edge portion of the optical sheet is similar with a case where the sheet holder is formed along the long-axis edge portion of the optical sheet. Hence, a detailed description of the case where the sheet holder is formed along the short-axis edge portion of the optical sheet will be omitted. FIGS. 3 and 4 show only the second prism sheet disposed in the uppermost of the optical sheet for description convenience.

Referring to FIGS. 3 and 4, the sheet holder 150a can be formed integrally with the frame 140. The sheet holder 150a can be additionally formed of the same material of the frame 140 at the time of injection molding of the frame 140 because the frame 140 can be formed through injection molding.

The backlight unit can have the sheet holder 150a of a dot type, but this is not intended to limit the scope of the present invention. In detail, the backlight unit can also have a different type of sheet holder including a bar type sheet holder 150b. The bar type sheet holder 150b and the dot type sheet holder 150a all are to prevent a deformation of the optical sheet, and are merely different in shape only. Thus, only the dot type sheet holder will be described below. This description is identically applicable also to the optical sheet with the bar type sheet holder.

The sheet holder 150a can be formed one or more at a bottom part of the frame 140 facing an edge portion of the second prism sheet 136 along an X-axis direction that is a long-axis direction of the second prism sheet 136.

The sheet holder 150a can get in contact with a long-axis edge portion of the second prism sheet 136 discontinuously or continuously. For example, the sheet holder 150a can get in contact with the long-axis edge portion of the second prism sheet 136 by point contact or line contact.

A shape of the sheet holder 150a can be at least one of a semisphere, a semiellipsoid, and a polyhedron, but this is not intended to limit the scope of the present invention.

A height (H) of the sheet holder 150a can be within a range of about 100 µm to 800 µm, in more detail, 150 µm to 400 µm. In a case where the height (H) of the sheet holder 150a is 100 µm or more, a foreign substance can be prevented to the maximum from being introduced between the frame 140 and the second prism sheet 136 through between the sheet holder 150a within limits in which a deformation of the second prism sheet 136 caused by a heat can be prevented. Also, in a case where the height (H) of the sheet holder 150a is 800 µm or less, a deformation of the second prism sheet 136 can be suppressed to the maximum within limits in which a foreign substance can be prevented from being introduced between the frame 140 and the second prism sheet 136 through between the sheet holder 150a.

The height (H) of the sheet holder 150a can be constant along the long-axis edge portion of the second prism sheet 136 within the above range.

An interval (Ls) between the sheet holders 150a can be about 0.01 to 0.1 times, in more detail, 0.02 to 0.05 times of a long-axis length (Lx) of the frame 140. This is to effectively prevent a deformation of the second prism sheet 136 by getting the interval (Ls) between the sheet holders 150a to be within the above range, because the sheet holder 150a does not get in continuous contact with the second prism sheet 136.

The interval (Ls) between the sheet holders 150a can be constant along the long-axis edge portion of the second prism sheet 136 within the above range.

As described above, the sheet holder 150a is disposed between the frame 140 and the optical sheet 130 such that it can hold the optical sheet 130 by pressing the second prism sheet 136 disposed in the uppermost of the optical sheet 130. This leads to preventing a deformation of the optical sheet 130 caused by a heat, improving a display quality of the backlight unit 110 and the liquid crystal display device comprising the backlight unit 110.

FIGS. 5 and 6 are views illustrating a sheet holder in detail according to an exemplary embodiment of the present invention. FIGS. 5 and 6 show an example in which the sheet holder is formed along a long-axis edge portion of a frame. The sheet holder can be formed along a long-axis or short-axis edge portion of the frame. A case where the sheet holder is formed along the short-axis edge portion of the frame is similar with a case where the sheet holder is formed along the long-axis edge portion of the frame. Hence, a detailed description of the case where the sheet holder is formed along the short-axis edge portion of the frame will be omitted. The sheet holder shown in FIGS. 5 and 6 is identical with the sheet holder shown in FIGS. 3 and 4 excepting that its height is variable depending on position. Thus, a repeated description will be omitted, and its feature only will be described. FIGS. 5 and 6 show only a second prism sheet disposed in the uppermost of an optical sheet for description convenience.

Referring to FIGS. 5 and 6, a height (H) of the sheet holder 150a according to an exemplary embodiment of the present invention can be within a range of about 100 µm to 800 µm, in detail, 150 µm to 400 µm.

The height (H) of the sheet holder 150a is variable depending on a long-axis edge portion of the prism within the above range. For example, the height (H) of the sheet holder 150a can become greater within the above range as the sheet holder goes from terminal end of the frame's edge portions toward the center part thereof, but this is not intended to limit the scope of the present invention.

By varying the height (H) of the sheet holder 150a as above, a deformation of the optical sheet can be effectively prevented when the optical sheet is partially subjected to non-uniform thermal expansion.

FIGS. 7 and 8 are views illustrating a sheet holder in detail according to an exemplary embodiment of the present invention. FIGS. 7 and 8 show an example in which the sheet holder is formed along a long-axis edge portion of a frame. The sheet holder can be formed along a long-axis or short-axis edge portion of the frame. A case where the sheet holder is formed along the short-axis edge portion of the frame is similar with a case where the sheet holder is formed along the long-axis edge portion of the frame. Hence, a detailed description of the case where the sheet holder is formed along the short-axis edge portion of the frame will be omitted. The sheet holder shown in FIGS. 7 and 8 is identical with the sheet holder shown in FIGS. 3 and 4 excepting that an interval between the sheet holders is variable depending on position. Thus, a repeated description will be omitted, and its feature only will be described. FIGS. 7 and 8 show only a second prism sheet disposed in the uppermost of an optical sheet for description convenience.

Referring to FIGS. 7 and 8, an interval (Ls) between the sheet holders 150*a* can be about 0.01 to 0.1 times, in more detail, 0.02 to 0.05 times of a long-axis length (Lx) of the frame 140.

The interval (Ls) between the sheet holders 150*a* is variable along a long-axis edge portion of the frame within the above range. For example, the length (Ls) between the sheet holders 150*a* can become greater within the above range as the sheet holder goes from terminal end of the frame's edge portion toward the center part thereof, but this is not intended to limit the scope of the present invention.

By varying the length (Ls) between the sheet holders 150*a* as above, a deformation of the optical sheet can be effectively prevented when the optical sheet is partially subjected to non-uniform thermal expansion.

FIG. 9 is a view illustrating a sheet holder in detail according to an exemplary embodiment of the present invention. FIG. 9 shows a case where the sheet holder is formed along a long-axis edge portion of a frame. The sheet holder can be formed along a long-axis or short-axis edge portion of the frame. A case where the sheet holder is formed along the short-axis edge portion of the frame is similar with a case where the sheet holder is formed along the long-axis edge portion of the frame. Hence, a detailed description of the case where the sheet holder is formed along the short-axis edge portion of the frame will be omitted. The sheet holder shown in FIG. 9 is identical with the above description excepting that the sheet holder is attached to the frame by an adhesive member. Thus, a repeated description will be omitted, and its feature only will be described. FIG. 9 shows only a second prism sheet disposed in the uppermost of an optical sheet for description convenience.

Referring to FIG. 9, the sheet holder 150*c* according to an exemplary embodiment of the present invention can be attached to the frame 140 by the adhesive member 152, for example, an adhesive and a both-sided adhesive tape. A substance of the sheet holder 150*c* can be identical or different from a substance of the frame 140. In detail, the substance of the sheet holder 150*c* can be at least one of epoxy, polyurethane, polycarbonate, and polyacrylate.

The height (H) of the sheet holder 150*c* can be within a range of about 100 μm to 800 μm, in more detail, 150 μm to 400 μm. The height (H) of the sheet holder 150*c* is constant or variable depending on the long-axis edge portion of the prism within the above range.

The interval (Ls) between the sheet holders 150*c* can be about 0.01 to 0.1 times, in more detail, 0.02 to 0.05 times of the long-axis length (Lx) of the frame 140. The interval (Ls) between the sheet holders 150*c* is constant or variable along the long-axis edge portion of the frame within the above range.

Referring again to 1 and 2, the bottom cover 160 can comprise a bottom part 162 and a side part 164 formed to extend from the bottom part 162, providing a housing space. The housing space can house the light source 120 and the optical sheet 130. Also, the bottom cover 160 can house the reflector plate 170 and the light guide plate 180 in the housing space. The reflector plate 170 is disposed under the light guide plate 180 and can upwardly reflect light emitted downwardly via the light guide plate 180 among light emitted from the light source 120.

The light guide plate 180 is disposed to face the light source 120 and can guide light incident from the light source 120 such that the light can be emitted upwardly.

FIG. 10 is an exploded perspective view illustrating a construction of a backlight unit in accordance with an exemplary embodiment of the present invention. FIG. 11 is a cross section taken along line VIII-VIII' of FIG. 10.

FIGS. 10 and 11 show a direct type backlight unit. However, this is to describe a backlight unit according to an exemplary embodiment of the present invention, hence, is not intended to limit the scope of the present invention. The backlight unit shown in FIGS. 10 and 11 is similar with the backlight unit shown in FIGS. 1 and 2 excepting that a disposition of the light source is different. Thus, a repeated description will be omitted, and its feature only will be described.

Referring to FIGS. 10 and 11, the backlight unit 210 according to an exemplary embodiment of the present invention can be comprised in a liquid crystal display device. The backlight unit 210 can provide light to a liquid crystal panel comprised in the liquid crystal display device.

The backlight unit 210 can comprise a light source 220, an optical sheet 230, a frame 240, and a sheet holder 250*a*. The backlight unit 210 can further comprise a bottom cover 260, a reflector plate 270, and a diffuser plate 280.

The light source 220 can receive a voltage applied from an external driving power source, generating and emitting light. The light source 220 can be formed one or more under the diffuser plate 280. Light emitted from the light source 220 can be directly incident on the diffuser plate 280.

The optical sheet 230 is disposed over the diffuser plate 280, and can improve optical characteristics of the light, for example, a luminance and a viewing angle by diffusing and concentrating light emitted from the light source 220.

For example, the optical sheet 230 can be configured to have a structure where three sheets, i.e., a diffuser sheet 232, a first prism sheet 234, and a protective sheet 236 are laminated in regular sequence. However, this is not intended to limit the number and a laminated sequence of the optical sheet 230. And 236 can be not the protective sheet, but a brightness enhancement sheet.

The frame 240 is formed in an approximately square shape, and can be disposed in the outermost of constituent elements of the backlight unit 210 to surround an edge portion of the optical sheet 230.

The sheet holder 250*a* can be disposed at a bottom part of the frame 240 facing the optical sheet 230. The sheet holder 250*a* is formed along a long-axis or short-axis edge portion of the frame 240, and can be formed one or more. The sheet holder 250*a* can hold the optical sheet 230, specifically, the second prism sheet 236 disposed in the uppermost of the optical sheet 230 by pressing the optical sheet 230 in Z-axis direction.

The sheet holder 250*a* can prevent a deformation of the optical sheet 230 caused by a heat radiated from the light source 220 as holding the optical sheet 230. For example, wrinkles, etc. can be prevented. As a result, a display quality of the backlight unit 210 and the liquid crystal display device comprising the backlight unit 210 can be improved.

The diffuser plate 280 is disposed between the light source 220 and the optical sheet 230 and can upwardly diffuse light incident from the light source 220.

FIG. 12 is an exploded perspective view illustrating a construction of a liquid crystal display device in accordance with an exemplary embodiment of the present invention. FIG. 13 is a cross section taken along line XX' of FIG. 12.

FIGS. 12 and 13 show the backlight unit shown in FIGS. 1 and 2 as a backlight unit of the liquid crystal display device. However, this is to describe the liquid crystal display device comprising the backlight unit according to an exemplary embodiment of the present invention and hence, is not intended to limit the scope of the present invention. Thus, the liquid crystal display device comprising the backlight unit shown in FIGS. 10 and 11 makes no difference. The backlight unit shown in FIGS. 12 and 13 is the same as described above. Hence, a repeated description will be omitted and its feature only will be described.

Referring to FIGS. 12 and 13, the liquid crystal display device 300 displays an image using electro optic characteristics of liquid crystal.

The liquid crystal display device 300 can comprise a backlight unit 110 and a liquid crystal panel 310.

The backlight unit 110 can be installed under a liquid crystal panel 310 and can provide light to the liquid crystal panel 310.

The backlight unit 110 can comprise a light source 120, an optical sheet 130, a frame 140, and a sheet holder 150a. The backlight unit 110 can further comprise a bottom cover 160, a reflector plate 170, and a light guide plate 180.

The liquid crystal panel 310 is disposed over the frame 140 and can be fixed by a top cover 320 combined with a bottom cover 160 in a top down manner.

The liquid crystal panel 310 can display an image using light radiated from the light source 120 of the backlight unit 110.

The liquid crystal panel 310 can comprise a color filter substrate 312 and a thin film transistor substrate 314 that face each other, interposing a liquid crystal.

The color filter substrate 312 can realize a color of an image displayed through the liquid crystal panel 310.

The color filter substrate 312 can comprise a color filter array formed as a thin film on a transparent substrate, for example, red/green/blue color filters. An upper polarization plate can be disposed over the color filter substrate 312.

The thin film transistor substrate 314 can electrically connect with a printed circuit board 318 where a plurality of circuit parts are mounted through a driving film 316. The thin film transistor substrate 314 applies a driving voltage from the printed circuit board 318 to a liquid crystal in response to a driving signal from the printed circuit board 318.

The thin film transistor substrate 314 can comprise a thin film transistor and a pixel electrode formed as a thin film on a different substrate of a transparent material such as glass or plastic.

A lower polarization plate can be attached to a bottom part of the thin film transistor substrate 314.

The invention claimed is

1. A backlight unit, comprising:
   a light source;
   an optical sheet to pass light from the light source;
   a frame surrounding an edge portion of the optical sheet; and
   at least one sheet holder coupled to the frame and in contact with a top surface of the optical sheet.

2. The backlight unit of claim 1, wherein the sheet holder is either a bar type or a dot type.

3. The backlight unit of claim 1, wherein the sheet holder extends from a portion of the frame that at least partially overlaps the optical sheet, the sheet holder extending in a direction toward the top surface of the optical sheet to contact the top surface of the optical sheet.

4. The backlight unit of claim 1, wherein the sheet holder is made at least one of epoxy, polyurethane, polycarbonate, or polyacrylate.

5. The backlight unit of claim 2, wherein a shape of the sheet holder of the dot type is at least one of a semisphere, a semiellipsoid, or a polyhedron.

6. A backlight unit of comprising:
   a light source:,
   an optical sheet to pass light from the light source;
   a frame surrounding an edge portion of the optical sheet; and
   at least one sheet holder coupled to the frame, wherein a height of the sheet holder is substantially 100 to 800 µm.

7. The backlight unit of claim 1, wherein a height of the sheet holder is substantially constant.

8. The backlight unit of claim 7, wherein a height of the sheet holder changes over a length of the frame.

9. A backlight unit comprising:
   a light source;
   an optical sheet to pass light from the light source;
   a frame surrounding an edge portion of the optical sheet; and
   a plurality of sheet holders coupled to the frame and facing the optical sheet,
   wherein an interval between the sheet holders is substantially 0.01 to 0.1 times a length of the frame.

10. The backlight unit of claim 1, further comprising:
    a plurality of sheet holders coupled to the frame,
    wherein an interval between the sheet holders is substantially constant.

11. A backlight unit comprising:
    a light source;
    an optical sheet to pass light from the light source;
    a frame surrounding an edge portion of the optical sheet; and
    a plurality of sheet holders coupled to the frame, wherein intervals between adjacent ones of the sheet holders change over a length of the frame.

12. A liquid crystal display device, comprising:
    an optical sheet to pass light from the light source;
    a frame surrounding an edge portion of the optical sheet;
    at least one sheet holder coupled to the frame and in contact with a top surface of the optical sheet; and
    a liquid crystal display panel coupled to the frame.

13. The liquid crystal display device of claim 12, wherein the sheet holder is either a bat type or a dot type.

14. The liquid crystal display device of claim 12, wherein the sheet holder extends from a portion of the frame that at least partially overlaps the optical sheet, the sheet holder extending in a direction toward the top surface of the optical sheet to contact the top surface of the optical sheet.

15. The liquid crystal display device of claim 12, wherein the sheet holder is made at least one of epoxy, polyurethane, polycarbonate, or polyacrylate and is attached at the frame.

16. The liquid crystal display device of claim 13, wherein a shape of the sheet holder of the dot type is at least one of a semisphere, a semiellipsoid, or a polyhedron.

17. A liquid crystal display device comprising:
    an optical sheet to pass light from the light source;
    a frame surrounding an edge portion of the optical sheet;
    at least one sheet holder coupled to the frame and facing the optical sheet and a liquid crystal display panel coupled to the frame, wherein a height of the sheet holder is substantially 100 to 800 µm.

18. The liquid crystal display device of claim 12, wherein a height of the sheet holders is substantially constant.

19. A liquid crystal display device comprising:
   an optical sheet to pass light from the light source;
   a frame surrounding an edge portion of the optical sheet;
   a plurality of sheet holders coupled to the frame; and
   a liquid crystal display panel coupled to the frame, wherein intervals between adjacent ones of the sheet holders is substantially 0.01 to 0.1 times a length of the frame.

20. The liquid crystal display device of claim 12, further comprising:
   a plurality of sheet holders,
   wherein an interval between the sheet holders is substantially constant.

* * * * *